(12) United States Patent
Ollila et al.

(10) Patent No.: US 11,688,046 B2
(45) Date of Patent: Jun. 27, 2023

(54) SELECTIVE IMAGE SIGNAL PROCESSING

(71) Applicant: Varjo Technologies Oy, Helsinki (FI)

(72) Inventors: Mikko Ollila, Tampere (FI); Kai Inha, Järvenpää (FI)

(73) Assignee: Varjo Technologies Oy, Helsinki (FI)

( * ) Notice: Subject to any disclaimer, the term of this patent is extended or adjusted under 35 U.S.C. 154(b) by 215 days.

(21) Appl. No.: 17/238,335

(22) Filed: Apr. 23, 2021

(65) Prior Publication Data

US 2022/0343472 A1     Oct. 27, 2022

(51) Int. Cl.
*G06T 5/00*     (2006.01)
*G06F 3/01*     (2006.01)
*H04N 25/68*     (2023.01)

(52) U.S. Cl.
CPC .............. *G06T 5/007* (2013.01); *G06F 3/013* (2013.01); *G06T 5/002* (2013.01); *G06T 5/003* (2013.01); *H04N 25/68* (2023.01)

(58) Field of Classification Search
CPC ......... G06T 5/007; G06T 5/002; G06T 5/003; G06F 3/013; H04N 5/367; H04N 5/23229
See application file for complete search history.

(56) References Cited

U.S. PATENT DOCUMENTS

| 10,690,929 | B1* | 6/2020 | Sulai | G06F 3/013 |
| 11,301,968 | B1* | 4/2022 | Lebrun | G06T 5/005 |
| 2012/0154634 | A1 | 6/2012 | Sugimura | |
| 2014/0133749 | A1 | 5/2014 | Kuo et al. | |
| 2018/0317868 | A1* | 11/2018 | Terui | A61B 6/4241 |
| 2020/0049946 | A1 | 2/2020 | Peuhkurinen et al. | |
| 2020/0183490 | A1* | 6/2020 | Klingstrom | G06T 7/73 |
| 2020/0234407 | A1 | 7/2020 | Ollila | |
| 2021/0080727 | A1* | 3/2021 | Yamada | G02B 30/22 |
| 2021/0405370 | A1* | 12/2021 | Lee | G02B 27/0172 |
| 2022/0334357 | A1* | 10/2022 | Yi | G06T 3/40 |

FOREIGN PATENT DOCUMENTS

WO    2020215263 A1    10/2020

OTHER PUBLICATIONS

Notification of Transmittal of The International Search Report and The Written Opinion of The International Searching Authority, or The Declaration, Application No. PCT/FI2022/050213, dated Sep. 8, 2022, 14 pages.

\* cited by examiner

*Primary Examiner* — Bobbak Safaipour
*Assistant Examiner* — Benedict E Lee
(74) *Attorney, Agent, or Firm* — Ziegler IP Law Group, LLC

(57) ABSTRACT

A system including image sensor(s) including a plurality of pixels arranged on a photo-sensitive surface thereof; and image signal processor(s) configured to: receive, from image sensor(s), a plurality of image signals captured by corresponding pixels of image sensor(s); and process the plurality of image signals to generate at least one image, wherein, when processing, image signal processor(s) is configured to: determine, for a given image signal to be processed, a position of a given pixel on the photo-sensitive surface that is employed to capture the given image signal; and selectively perform a sequence of image signal processes on the given image signal and control a plurality of parameters employed for performing the sequence of image signal processes, based on the position of the given pixel.

30 Claims, 4 Drawing Sheets

SELECTIVE IMAGE SIGNAL PROCESSING

TECHNICAL FIELD

The present disclosure relates to systems incorporating selective image signal processing. Moreover, the present disclosure relates to methods for selective image signal processing implemented via such systems.

BACKGROUND

Nowadays, with an increase in the number of images being captured every day, there is an increased demand for image signal processing. For example, such a demand may be quite high and critical in case of evolving technologies such as extended-reality (XR). Several advancements are being made to develop techniques for image signal processing that facilitate in saving time and are cost-effective.

However, existing techniques for image signal processing have several limitations associated therewith. Firstly, the existing techniques for image signal processing are used to uniformly process image signals corresponding to an image (i.e. image signals corresponding to each part of the image are processed in the same manner to a same extent of processing). Thus, an entirety of the image signals corresponding to the image are invariably similarly processed for example, to achieve a uniform colour-fidelity, denoising, and the like, in the (subsequently generated) image. For such uniform processing, the existing techniques require considerable processing resources, long processing time, and high computing power. Secondly, existing techniques are unable to cope with visual quality requirements that arise, for example, due to high-resolution, small pixel size, and high frame-rate requirements in some display devices (such as XR devices).

Resultantly, image generation is performed in a manner that generated images lack the requisite visual quality. This leads to a poor, non-immersive viewing experience for the user, when these images are shown to the user.

Therefore, in light of the foregoing discussion, there exists a need to overcome the aforementioned drawbacks associated with existing techniques for image signal processing.

SUMMARY

The present disclosure seeks to provide a system incorporating selective image signal processing. The present disclosure also seeks to provide a method for selective image signal processing. An aim of the present disclosure is to provide a solution that overcomes at least partially the problems encountered in prior art.

In one aspect, an embodiment of the present disclosure provides a system comprising:
  at least one image sensor comprising a plurality of pixels arranged on a photo-sensitive surface thereof, and
  at least one image signal processor configured to:
    receive, from the at least one image sensor, a plurality of image signals captured by corresponding pixels of the at least one image sensor; and
    process the plurality of image signals to generate at least one image, wherein, when processing, the at least one image signal processor is configured to:
      determine, for a given image signal to be processed, a position of a given pixel on the photo-sensitive surface that is employed to capture the given image signal; and
      selectively perform a sequence of image signal processes on the given image signal and control a plurality of parameters employed for performing the sequence of image signal processes, based on the position of the given pixel.

In another aspect, an embodiment of the present disclosure provides a method for selective image signal processing, via a system comprising at least one image sensor, wherein the at least one image sensor comprises a plurality of pixels arranged on a photo-sensitive surface thereof, the method comprising:
  receiving, from the at least one image sensor, a plurality of image signals captured by corresponding pixels of the at least one image sensor; and
  processing the plurality of image signals to generate at least one image by:
    determining, for a given image signal to be processed, a position of a given pixel on the photo-sensitive surface that is employed to capture the given image signal; and
    selectively performing a sequence of image signal processes on the given image signal and controlling a plurality of parameters employed for performing the sequence of image signal processes, based on the position of the given pixel.

Embodiments of the present disclosure substantially eliminate or at least partially address the aforementioned problems in the prior art, and enable efficient selective image signal processing to generate highly immersive and realistic images, in a manner that the at least one image signal processor is not excessively computationally overburdened.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4A is a schematic illustration of a symmetrical optical element, while

Figure 1:
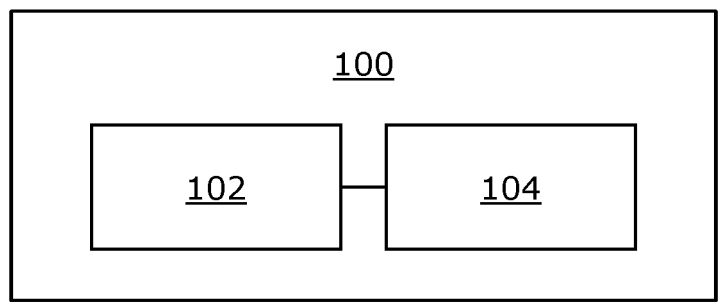
FIGS. 1 and 2 illustrate block diagrams of architectures of a system, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system comprising:
at least one image sensor comprising a plurality of pixels arranged on a photo-sensitive surface thereof; and
at least one image signal processor configured to:
receive, from the at least one image sensor, a plurality of image signals captured by corresponding pixels of the at least one image sensor; and
process the plurality of image signals to generate at least one image, wherein, when processing, the at least one image signal processor is configured to:
determine, for a given image signal to be processed, a position of a given pixel on the photo-sensitive surface that is employed to capture the given image signal; and
selectively perform a sequence of image signal processes on the given image signal and control a plurality of parameters employed for performing the sequence of image signal processes, based on the position of the given pixel.

In another aspect, an embodiment of the present disclosure provides a method for selective image signal processing, via a system comprising at least one image sensor, wherein the at least one image sensor comprises a plurality of pixels arranged on a photo-sensitive surface thereof, the method comprising:
receiving, from the at least one image sensor, a plurality of image signals captured by corresponding pixels of the at least one image sensor; and
processing the plurality of image signals to generate at least one image by:
determining, for a given image signal to be processed, a position of a given pixel on the photo-sensitive surface that is employed to capture the given image signal; and
selectively performing a sequence of image signal processes on the given image signal and controlling a plurality of parameters employed for performing the sequence of image signal processes, based on the position of the given pixel.

The present disclosure provides the aforementioned system incorporating selective image signal processing and the aforementioned method for selective image signal processing. Depending on where the position of the given pixel lies on the photo-sensitive surface of the at least one image sensor, a requisite sequence of image signal processes are performed on the given image signal and the plurality of parameters are controlled (namely, modified or adjusted) accordingly to provide a requisite extent of processing for the given image signal when generating the at least one image. Therefore, different image signals corresponding to different parts of the at least one image are processed differently (i.e. in a non-uniform manner). In such a case, the at least one image signal processor selectively (i.e. customisably) performs the sequence of image signal processes and controls the plurality of parameters employed therefor in a manner that image signal processor overburdening, delays, and excessive power consumption do not occur during processing of the plurality of image signals to generate the at least one image. In this regard, conservation and utilization of processing resources of the at least one image signal processor is optimized. Furthermore, the at least one image signal processor effectively copes with visual quality requirements of various display devices, to generate the at least one image with a requisite visual quality. The at least one image signal processor can be judiciously used to also perform other processing tasks, if required. This facilitates an increase in overall efficiency of the at least one image signal processor. The method is fast, effective, reliable and can be implemented with ease.

Throughout the present disclosure, the term "image sensor" refers to a device detects light from a real-world environment at the photo-sensitive surface thereof, thereby enabling the plurality of pixels arranged on the photo-sensitive surface to capture the plurality of image signals. The plurality of image signals are electrical signals pertaining to a real-world scene of the real-world environment. It will be appreciated that the light entering the at least one image sensor optionally passes through a colour filter array and is then captured as the plurality of images signals by the plurality of pixels at an input interface of the at least one image sensor. The input interface is based, for example, on Mobile Industry Processor Interface (MIPI) specification. Examples of the at least one image sensor include, but are not limited to, a charge-coupled device (CCD) image sensor, and a complementary metal-oxide-semiconductor (CMOS) image sensor. Optionally, the system comprises a plurality of image sensors with corresponding image signal processors, wherein the image signal processors perform all requisite operations of the first aspect.

It will be appreciated that the plurality of pixels could be arranged in a required manner (for example, such as a rectangular two-dimensional (2D) grid, a polygonal arrangement, a circular arrangement, an elliptical arrangement, a freeform arrangement, and the like) on the photo-sensitive surface of the at least one image sensor. In an example, the at least one image sensor may comprise 6 pixels A1, A2, A3, A4, A5, and A6 arranged in the rectangular 2D grid on the photo-sensitive surface. Herein, the 6 pixels A1, A2, A3, A4, A5, and A6 of the at least one image sensor may capture 6 image signals B1, B2, B3, B4, B5, and B6, respectively. Optionally, an aspect ratio of a given pixel is different for different regions within the photo-sensitive surface. The aspect ratio of the given pixel refers to a ratio of a width of the given pixel to a height of the given pixel. For some regions within the photo-sensitive surface, a given pixel could have a high aspect ratio (such as 2:1), while for other regions within the photo-sensitive surface, a given pixel could have a low aspect ratio (such as 1:1). In this regard, a number pixels in one region may be different from a number pixels in another region. Optionally, the aspect ratio of the given pixel depends on a position of the given pixel on the photo-sensitive surface. As an example, pixels located at a central region within the photo-sensitive surface may have high aspect ratios. There could also be empty region(s) within the photo-sensitive surface where no pixel would be present.

It will be appreciated that the at least one image sensor is a part of at least one camera. The at least one camera could be arranged anywhere in the real-world environment where a user is present, or be arranged on a remote device (for example, a drone, a vehicle, a robot, and the like) present in the real-world environment, or be arranged on a head-mounted display (HMD) worn by the user on his/her head. When there are employed a plurality of image sensors in a plurality of cameras, the at least one image is re-projected according to a change in viewpoints and view directions of the plurality of cameras. Optionally, the at least one camera is implemented as at least one visible light camera. Examples of a given visible light camera include, but are not limited to, a Red-Green-Blue-Depth (RGB), a monochrome camera. It will be appreciated that the at least one camera could be implemented as a combination of the given visible light camera and a depth camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. For example, the at least one camera may be implemented as the stereo camera.

Throughout the present disclosure, the term "image signal processor" refers to hardware, software, firmware or a combination of these responsible for processing the plurality of image signals to generate the at least one image. The at least one image signal processor controls operation of the aforementioned system. The at least one image signal processor is communicably coupled to the at least one image sensor wirelessly and/or in a wired manner. In an example, the at least one image signal processor may be implemented as a programmable digital signal processor (DSP). In another example, the at least one image signal processor may be implemented via a cloud server that provides a cloud computing service.

It will be appreciated that the at least one image represents the real-world scene of the real-world environment. In some implementations, the at least one image comprises a single image, whereas in other implementations, the at least one image comprises a plurality of images.

Optionally, when determining the position of the given pixel on the photo-sensitive surface, the at least one image signal processor is configured to sequentially scan the photo-sensitive surface via a serial interface controller. In such a case, a number of pixels that are scanned, along with their corresponding positions (namely, spatial positions) on the photo-sensitive surface, is accurately known to the at least one image signal processor via the serial interface controller. The count of the number of pixels that are scanned is associated with the positions of said pixels on the photo-sensitive surface. In an example, the serial interface controller could be an MIPI-Camera Serial Interface (MIPI-CSI®) controller.

Notably, depending on where the position of the given pixel lies on the photo-sensitive surface, the sequence of image signal processes are selectively performed and the plurality of parameters are controlled (namely, modified or adjusted) to provide a requisite extent of processing for the given image signal. Beneficially, selectively performing the sequence of image signal processes and controlling the plurality of parameters employed therefor aims to reduce a computational burden on the at least one image signal processor during processing of the plurality of image signals. This is because the plurality of image signals are captured by the corresponding pixels at different positions on the photo-sensitive surface, and may require different processing since these pixels would be viewed differently by the user in the at least one image. Moreover, selectively performing the sequence of image signal processes and controlling the plurality of parameters therefor optionally emulates image viewing quality and characteristics of human visual system in the at least one image, not just in terms of a spatial resolution, but also a colour resolution, a grayscale resolution, a colour accuracy, a luminance accuracy, an edge (spatial frequency) accuracy, a noise and temporal resolution, and the like.

It will be appreciated that in the at least one image signal processor, the plurality of parameters employed for performing the sequence of image signal processes, are optionally controlled by a control module. In this regard, the control module is a part of the at least one image signal processor. The control module receives as input, one or more input factors (such as information indicative of a gaze direction of the user, a rate at which a pose of the image sensor is changing while capturing the image signals, and the like) from another module (such as gaze-tracking system, image sensor pose-tracking system, and the like).

Optionally, the at least one image signal processor comprises a plurality of hardware blocks, wherein a given hardware block is configured to perform a given image signal process or a processing step of a given image signal process from amongst the sequence of image signal processes. The given image signal process has at least one processing step. Optionally, the plurality of hardware blocks are associated with separate switches, wherein a given switch activates the given hardware block to perform the given image signal process, based on the position of the given pixel. In such a case, each hardware block is separately controllable. Alternatively, optionally, an entirety of the plurality of hardware blocks are associated with a single switch, wherein the single switch activates the entirety of the plurality of hardware blocks to perform the sequence of image signal processes, based on the position of the given pixel. In such a case, all the hardware blocks are controlled in a similar manner. These implementations of the plurality of hardware blocks are feasible because the plurality of hardware blocks could be implemented using silicon chips, which are cheap and provide fast processing.

Examples of the given image signal process include, but are not limited to, black level correction, defective pixel correction (DPC), Bayer domain denoising, lens shading correction, scaling, automatic white balance gain adjustment, demosaicking, automatic white balance static parameters adjustment, colour conversion matrix interpolation, autofocus, auto exposure, gamma correction, colour space conversion, luma and chroma denoising, sharpening and edge enhancement, contrast adjustment, shot noise correction, chromatic aberration correction, reprojection, cropping, and resizing. As an example, the given image signal process may be the DPC, having two processing steps that are defective pixel detection (DPD), and subsequently either noise cleaning or defective pixel cancellation.

Examples of the plurality of parameters include, but are not limited to, colour conversion matrix, colour temperature, scaling factor, shutter speed, lens aperture, pixel intensity, pixel size, an amount of shading, denoising factor, a search window, a number of colour planes or pixels to be processed, a pixel step, a pixel granularity, a number of iterations, a sigma value, a sigma space value, a sigma color value, a number of statistical factors, a number of digits, a magnitude of a gain, a threshold value, a width of a template window, a length of a template window, a width of kernel, a length of kernel, and a number of pyramid layers. It will be appreciated that a given parameter is employed during a corresponding image signal process of the aforementioned sequence. When performing the corresponding image signal process on the given image signal, the given parameter is taken into account.

In an example, when the real-world environment has an excessively bright lighting condition, a group of pixels that are positioned on the at least one image sensor to capture this excessive light may become saturated. In such a case, shutter speed and/or lens aperture of the at least one camera may be reduced to prevent this saturation of said group of pixels. In another example, another image signal process that may be performed for image signals captured by said group of pixels is auto white balance, wherein colour temperature of the scene is estimated by analysing a histogram of said group of pixels and a closest matching colour temperature of the lighting condition is used as a correction for auto white balance. In yet another example, when performing black level correction, a pixel intensity of the given pixel that is employed to capture the given image signal is controlled.

Optionally, the at least one image signal processor is configured to selectively perform the sequence of image signal processes and control the plurality of parameters employed therefor, further based on at least one of: a temperature of the at least one image sensor, a rate at which a pose of the at least one image sensor is changing while capturing the plurality of image signals.

Typically, the temperature of the at least one image sensor is directly related to a number of defective pixels (namely, dead pixels or hot pixels) in the at least one image sensor. In other words, greater the temperature of the at least one image sensor, greater the number of defective pixels in the at least one image sensor, and vice versa. A defective pixel may have a constant bright colour value (for example, the defective pixel may be a black pixel, or a white pixel, or similar) or may have a temporally oscillating bright colour value. In an example, when the temperature of the at least one image sensor is 20 degree Celsius, 60 degree Celsius, or 80 degree Celsius, a number of defective pixels may be 36, 1376, or 6781, respectively. Optionally, for a given temperature of the at least one image sensor, image signals captured by the defective pixels are heavily processed, whereas image signals captured by other pixels are lightly processed. In other words, the image signals captured by the defective pixels require heavier (namely, more) processing as compared to the image signals captured by the other pixels (i.e. non-defective pixels).

It will be appreciated that a heavy processing of a given image signal means, for example, that a high number of image signal processes are employed for processing the given image signal and/or a plurality of parameters employed for performing a sequence of such image signal processes on the given image signal are highly (accurately, precisely, and gradually) controlled, such as for changing, modifying or filtering the given image signal. The heavy processing of the given image signal could also mean that an extent of filtering or alteration is performed on the given image signal in a manner that an image quality parameter, such as a peak signal-to-noise ratio (PSNR) is highly improved. Likewise, a light processing of a given image signal means, for example, that a low number of image signal processes are employed for processing the given image signal and/or a plurality of parameters employed for performing a sequence of such image signal processes on the given image signal are lightly or moderately controlled. As an example, the light processing of the given image signal may be performed by reducing a search window (namely, a search range) and increasing a pixel step. By reducing the search window, a number of areas to be searched and processed would be reduced.

Optionally, the pose of the at least one image sensor is determined by employing pose-tracking means that is configured to detect and/or follow the pose of the at least one image sensor. The term "pose" encompasses both a position and an orientation. The pose-tracking means could be implemented as an internal component of the system, as a tracking system external to the system, or as a combination thereof. In reality, the pose-tracking means tracks a pose of the at least one camera, and said pose corresponds to the pose of the at least one image sensor. It will be appreciated that optionally when the pose of the at least one image sensor is changing at a low rate, the plurality of image signals are captured with low noise, and are subsequently lightly processed to generate the at least one image. In such a case, the plurality of image signals require low processing resources to generate the at least one image with an optimum visual quality. Optionally, when the pose of the at least one image sensor is changing at a high rate, the plurality of image signals are captured with high noise, and are subsequently heavily processed to generate the at least one image. In such a case, the plurality of image signals require high processing resources to generate the at least one image with an optimum visual quality.

Optionally, the at least one image signal processor is configured to:
  receive, from a display apparatus, information indicative of a gaze direction of a user;
  identify a gaze position on the photo-sensitive surface, based on the gaze direction of the user; and
  selectively perform the sequence of image signal processes on the given image signal and control the plurality of parameters employed therefor, further based on whether or not the given pixel lies within a predefined distance from the gaze position.

Herein, the term "display apparatus" refers to a display system that is configured to present an extended-reality (XR) environment to the user when the display apparatus, in operation, is worn by the user on his/her head. The display apparatus may also be referred to as "head-mounted display (HMD)". Herein, the term "extended-reality" encompasses virtual reality (VR), augmented reality (AR), mixed reality (MR), and the like. The display apparatus is communicably coupled to the at least one image signal processor wirelessly and/or in a wired manner.

In some implementations, the gaze direction is a current gaze direction. The display apparatus provides information indicative of the current gaze direction of the user to the at least one image signal processor, and the at least one image signal processor is configured to predict a next gaze direction of the user. In other implementations, the gaze direction is a predicted gaze direction. The display apparatus predicts the gaze direction of the user and provides the predicted gaze direction of the user to the at least one image signal processor. It will be appreciated that optionally the gaze direction of the user is predicted, based on motion of the user's gaze. The predicted gaze direction lies along a direction of the motion of the user's gaze. In such a case, the motion of the user's gaze could be determined in terms of velocity and/or acceleration of the user's gaze, using information indicative of previous gaze directions of the user and/or the current gaze direction of the user.

Optionally, the display apparatus comprises a gaze-tracking system for tracking the gaze direction of the user, wherein the gaze-tracking system is communicably coupled to the at least one image signal processor. The term "gaze-tracking system" refers to a specialized equipment for detecting and/or following gaze of the user, when the display apparatus in operation is worn by the user. The gaze-tracking system could be implemented as contact lenses with sensors, cameras monitoring a position of a pupil of the user's eye, and the like. Such gaze-tracking systems are well-known in the art. The gaze-tracking system is configured to collect gaze-tracking data, which constitutes the information indicative of the gaze direction of the user. Then, the gaze-tracking system sends the gaze-tracking data (i.e. said information) to the at least one image signal processor. It will be appreciated that the gaze-tracking data is collected repeatedly by the gaze-tracking system throughout a given session of using the display apparatus, as gaze of the user's eyes keeps changing whilst he/she uses the display apparatus. An up-to-date gaze-tracking data (indicative of the gaze direction of the user) allows for producing an up-to-date gaze-contingent image. This generated image is to be employed to produce an XR image for displaying at the display apparatus. Optionally, when producing the XR image using the at least one image, virtual content is superimposed on at least a portion of the at least one image. This virtual content is computer-generated visual content.

Optionally, the at least one image signal processor is configured to map the gaze direction of the user onto the photo-sensitive surface, for identifying the gaze position on the photo-sensitive surface. The term "gaze position" refers to a position on the photo-sensitive surface onto which the gaze direction is mapped.

Optionally, the predefined distance of the given pixel from the gaze position lies in a range of 3 degrees to 90 degrees from the gaze position. As an example, the predefined distance of the given pixel may be from 3, 6, 9, 12, 15, 18, 21, 24, 27, 30, 33, 36, 39, 42, 45, 48, 51, 54, 57, 60, 63, 66, 69, 72, 75, 78, 81, 84 or 87 degrees up to 6, 9, 12, 15, 18, 21, 24, 27, 30, 33, 36, 39, 42, 45, 48, 51, 54, 57, 60, 63, 66, 69, 72, 75, 78, 81, 84, 87 or 90 degrees from the gaze position. When the given pixel lies within the predefined threshold distance from the gaze direction, the given image signal is to be heavily processed, whereas when the position of the given pixel lies outside the predefined threshold distance from the gaze direction, the given image signal is to be lightly processed. This is because pixels lying within the predefined distance from the gaze position would be perceived in the at least one image with high visual acuity by foveas of the user's eye, as compared to pixels lying outside the predefined distance from the gaze position. Depending on where the given pixel lies with respect to the predefined distance (i.e. near to the gaze position or far from the gaze position), the plurality of parameters are controlled to provide a requisite extent of processing for the given image signal.

Optionally, the at least one image signal processor is configured to:
  determine at least a first region and a second region within the photo-sensitive surface whose image signals are to be processed differently;
  detect whether the position of the given pixel lies in the first region or the second region; and
  control the plurality of parameters based on whether the position of the given pixel lies in the first region or the second region.

In this regard, the first region and the second region are determined so that image signals captured by pixels lying therein are processed differently to generate the at least one image. Therefore, processing resource requirements for processing image signals corresponding to different regions of the photo-sensitive surface are different. This results in processing resource savings for processing image signals that only require light processing and effective processing resource utilization for processing image signals that require heavy processing.

Optionally, when the position of the given pixel lies in the first region, the given image signal is to be lightly processed, whereas when the position of the given pixel lies in the second region, the given image signal is to be heavily processed. In other words, image signals of pixels in the second region require heavier (namely, more) processing as compared to image signals of pixels in the first region. Depending on where the position of the given pixel lies (i.e., in the first region or in the second region), the plurality of parameters are controlled to provide a requisite extent of processing for the given image signal.

In an embodiment, the at least one image signal processor is configured to:
  receive, from a display apparatus, information indicative of a gaze direction of a user;
  identify a gaze position on the photo-sensitive surface, based on the gaze direction of the user; and
  determine the first region and the second region based on the gaze position on the photo-sensitive surface, wherein the second region includes and surrounds the gaze position, and the first region surrounds the second region.

Optionally, the first region and the second region are determined dynamically based on the gaze position. In such a case, the second region corresponds to the gaze position whereas the first region corresponds to a periphery of the gaze position. Such a dynamic manner of determining the first region and the second region emulates a way in which the user actively focuses within his/her field of view.

In another embodiment, the at least one image signal processor is configured to determine the first region and the second region based on a centre of the photo-sensitive surface, wherein the second region includes and surrounds the centre, and the first region surrounds the second region. In this regard, the first region and the second region are determined in a fixed manner according to the centre of the photo-sensitive surface. Generally, a user's gaze is directed towards a centre of his/her field of view. When the user wishes to view objects in a periphery of his/her field of view, the user typically turns his/her head in a manner that said objects lie at a centre of his/her current field of view. In such a case, the central portion of the user's field of view is resolved to a much greater degree of visual detail by the visual system of the user's eye, as compared to the peripheral portion of the user's field of view. The aforesaid fixed manner of determining the first region and the second region emulates a way in which users generally focus within their field of view.

It will be appreciated that when the first region and the second region are determined according to any of the aforesaid embodiments and the image signals of the pixels in the second region optionally require heavier (namely, more) processing as compared to the image signals of the pixels in the first region, an image quality of the at least one image so generated emulates image viewing quality and characteristics of human visual system. In such a case, the image signals of the pixels in the second region, that correspond to the (actively-tracked or generally-known) gaze direction of the user, are processed heavily to achieve a higher visual quality in gaze-contingent pixels of the at least one image, as compared to the image signals of the pixels in the first region that are processed lightly to achieve a relatively lower visual quality in remaining pixels (i.e. non-gaze-contingent pixels) of the at least one image.

Optionally, the system further comprises an optical element comprising a first optical portion and a second optical portion having a first focal length and a second focal length, respectively, the first optical portion and the second optical portion being arranged to pass light towards the first region and the second region of the photo-sensitive surface, respectively, wherein the at least one image signal processor is configured to control the plurality of parameters, based on the first focal length and the second focal length.

In this regard, the first optical portion and the second optical portion have different focal lengths, and thus, different magnification/demagnification properties. In other words, the optical element has a variable focal length. Optionally, the second focal length is greater than the first focal length. Therefore, a magnifying power of the second optical portion is greater than a magnifying power of the first optical portion. As a result, a portion of light that is passed towards the second region is magnified more than a portion of light that is passed towards the first region. In such a case, when the light entering the optical element is even, then an amount of light incident per pixel for the pixels in the second region is lesser than an amount of light incident per pixel for the pixels in the first region. Such an optical element arranged in front of the photo-sensitive surface is highly distortive. Therefore, the image signals of the pixels in the second region require different processing as compared to the image signals of the pixels in the first region. When the system utilizes the optical element (as described hereinabove), the at least one image generated upon processing the plurality of image signals is warped. By "warped", it means that a given image would appear distorted if viewed as such.

Optionally, when the at least one image is warped, an angular resolution of the at least one image is spatially-uniform. This is so because the pixels are uniformly arranged on the photo-sensitive surface of the at least one image sensor. By "spatially-uniform angular resolution", it is meant that the angular resolution of the at least one image is uniform across at least one imaginary plane on which the at least one image is produced. Optionally, the real-world environment imaginary plane corresponds to the at least one image sensor. Throughout the present disclosure, the term "angular resolution" of a given image refers to a number of pixels per degree (namely, points per degree (PPD)) of an angular width of a given region of the given image, wherein the angular width is measured from an imaginary point in a three-dimensional space.

Optionally, when an optical element has a high focal length, an angular resolution of the at least one image is high. In such a case, a resolution enhancement would not be required to be performed by the at least one image signal processor when processing the given image signal. Moreover, when the optical element has the high focal length, light entering the optical element is less, and thus different noise reductions may be required to be performed by the at least one image signal processor when processing the given image signal. Also, different compensations for luminance and colour shading characteristics may be required to be performed by the at least one image signal processor when processing the given image signal. Optionally, when an optical element has a low focal length, light entering the optical element is more. Thus, less noise reduction may be required to be performed by the at least one image signal processor when processing the given image signal. Moreover, when the optical element has the low focal length, an angular resolution of the at least one image may be so sparse that performing a sharpening process on the given image signal could be avoided to save resources of the at least one image signal processor.

Optionally, the optical element is implemented as at least one of: a lens, a mirror, a prism. Optionally, the optical element is implemented as a single lens having a complex shape. As an example, such a lens may have an aspheric shape. Optionally, the single lens is implemented as any of: a Fresnel lens, a Liquid Crystal (LC) lens or a liquid lens. Alternatively, optionally, the optical element is implemented as a single mirror having a complex shape. As an example, a reflective surface of such a mirror may have an aspheric shape. Yet alternatively, optionally, the optical element is implemented as a configuration of multiple lenses and/or mirrors. Optionally, in such a case, the first optical portion and the second optical portion are implemented as separate optical elements.

Optionally, the optical element is asymmetrical with respect to its optical axis. In such a case, the first optical portion and the second optical portion are positioned asymmetrically with respect to the optical axis of the optical element. Alternatively, optionally, the optical element is symmetrical with respect to its optical axis. In such a case, the second optical portion surrounds an optical centre of the optical element, wherein a centre of the second optical portion coincides with the optical centre of the optical element. Moreover, the first optical portion surrounds the second optical portion, and the first optical portion is surrounded by a periphery of the optical element. Optionally, when the optical element is symmetrical with respect to its optical axis, the first optical portion and the second optical portion are concentric to each other. Optionally, a shape of the second optical portion is one of: a circle, an ellipse, a polygon, a freeform shape.

Optionally, a rotational orientation of the optical element is adjusted for arranging the first optical portion and the second optical portion to pass light towards the first region and the second region of the photo-sensitive surface, respectively. Such rotation of the optical element may be employed when the first region and the second region are determined dynamically based on the gaze position. The optical element is rotated according to the gaze position using an actuator, said rotation occurring about a centre of rotation of the optical element.

Optionally, the optical element further comprises at least one intermediary optical portion between the first optical portion and the second optical portion, the at least one intermediary optical portion having a focal length that is different from the first focal length and the second focal length. The at least one intermediary optical portion has different magnification/demagnification properties as compared to the first optical portion and the second optical portion. Optionally, a third focal length of the at least one intermediary optical portion is higher than the first focal length, but smaller than the second focal length.

In an embodiment, the at least one image comprises a first image and a second image, wherein the at least one image signal processor is configured to:
   create a first copy and a second copy of image signals captured by pixels of the second region, wherein the first copy of the image signals is to be processed with image signals captured by pixels of the first region to generate the first image, while the second copy of the image signals captured by the pixels of the second region is to be processed separately to generate the second image, wherein the first image and the second image are to be displayed via a first light source and a second light source of a display apparatus, respectively, in a manner that a portion of the first image that is generated from the first copy of the image signals is to be optically combined with the second image;
   determine, for a given pixel of said portion of the first image, whether the given pixel of said portion of the first image or a corresponding pixel of the second image is to be displayed at the display apparatus, based on a type of feature to which the given pixel pertains; and
   selectively perform different sequences of image signal processes on an image signal captured by the given pixel and an image signal captured by the corresponding pixel, based on whether the given pixel or the corresponding pixel is to be displayed at the display apparatus.

Optionally, in this regard, the same camera is used to generate the first image and the second image. Notably, the image signals captured by the pixels of the second region are used to create the second image (by processing the second copy) as well as said portion of the first image that corresponds to the second image and is to be optically combined with the second image (by processing the first copy).

Herein, the term "light source" refers to an element from which light emanates. Optionally, a given light source is implemented as a display. In this regard, a given image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, a given image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector.

Optionally, the given light source is a single-resolution light source. The single-resolution light source is configured to display the given image at a single display resolution (namely, a uniform display resolution) only. Optionally, the first light source and the second light source are configured to display the first image and the second image, respectively, at different display resolutions, the display resolution of the second light source being higher than the display resolution of the first light source. The term "display resolution" of the given light source refers to a total number of pixels in each dimension of the given light source, or to a pixel density (namely, the number of pixels per unit distance or area) of the given light source.

Optionally, a projection of the first image and a projection of the second image are optically combined by an optical combiner in the display apparatus to produce a visual scene, in a manner that a projection of the portion of the first image that is generated from the first copy of the image signals is optically combined and superimposed upon a projection of the second image. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer.

Optionally, the at least one image signal processor is configured to extract features from the portion of the first image that is generated from the first copy of the image signals. Examples of the features include, but are not limited to, edges, corners, blobs, ridges, high-frequency features, low-frequency features. Optionally, the at least one image signal processor is configured to employ at least one image-processing algorithm to extract the features from said portion of the first image. Examples of the at least one image processing algorithm include, but are not limited to, an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a feature descriptor algorithm (for example, such as Binary Robust Independent Elementary Features (BRIEF), Gradient Location and Orientation Histogram (GLOH), Histogram of Oriented Gradients (HOG), and the like), a feature detector algorithm (for example, such as the SIFT, the SURF, Oriented FAST and rotated BRIEF (ORB), and the like).

Optionally, when the type of feature to which the given pixel pertains is at least one of: a blob, a large region, a large surface, a low-frequency feature, the given pixel of said portion of the first image is to be displayed at the display apparatus. This is because such a type of feature could be acceptably represented in the given pixel even at a low visual-fidelity or a low display resolution. In this regard, the image signal captured by the given pixel of said portion of the first image is lightly processed. Optionally, when the type of feature to which the given pixel pertains is at least one of: an edge, a corner, a high-frequency feature, the corresponding pixel of the second image is to be displayed at the display apparatus. This is because such a type of feature is to be represented in the corresponding pixel at a high visual-fidelity or a high display resolution. In this regard, the image signal captured by the corresponding pixel of the second image is heavily processed.

In another embodiment, the at least one image sensor comprises a first image sensor and a second image sensor, and the at least one image comprises a first image and a second image corresponding to image signals captured by pixels of the first image sensor and image signals captured by pixels of the second image sensor, respectively, and wherein a portion of a field of view captured in the first image overlaps with a field of view captured in the second image, further wherein the first image and the second image are to be displayed via a first light source and a second light source of a display apparatus, respectively, in a manner that a portion of the first image that corresponds to said portion of the field of view is to be optically combined with the second image, the at least one image signal processor being configured to:

determine, for a given pixel of said portion of the first image, whether the given pixel of said portion of the first image or a corresponding pixel of the second image is to be displayed at the display apparatus, based on a type of feature to which the given pixel pertains; and selectively perform different sequences of image signal processes on an image signal captured by the given pixel and an image signal captured by the corresponding pixel, based on whether the given pixel or the corresponding pixel is to be displayed at the display apparatus.

Optionally, in this regard, the first image sensor and the second image sensor are parts of a first camera and a second camera, respectively, wherein the first camera and the second camera are employed to capture the first image and the second image, respectively. The first image and the second image represent a same real-world scene of the real-world environment but with different extents of the real-world scene, owing to different fields of view being captured in the first image and the second image. Optionally, the field of view captured in the first image is greater than the field of view captured in the second image. Optionally, the field of view captured in the second image includes and surrounds the gaze position. Optionally, the field of view captured in the second image lies in a range of 0 to 40 degrees from the gaze position. As an example, the field of view captured in the second image may be from 0, 2, 4, 6, 8, 10, 12, 14, 16, 18, 20, 22, 24, 26, 28, 30, 32, 34, 36 or 38 degrees up to 2, 4, 6, 8, 10, 12, 14, 16, 18, 20, 22, 24, 26, 28, 30, 32, 34, 36, 38 or 40 degrees from the gaze position. The portion of the field of view captured in the first image which overlaps with the field of view captured in the second image corresponds to a portion of the real-world scene that is captured both by the first camera and the second camera.

Optionally, a projection of the first image and a projection of the second image are optically combined by an optical combiner in the display apparatus to produce a visual scene, in a manner that a projection of the portion of the first image that corresponds to said portion of the field of view is optically combined with and is superimposed upon a projection of the second image.

Optionally, when the type of feature to which the given pixel pertains is at least one of: a blob, a large region, a large surface, a low-frequency feature, the given pixel of said portion of the first image is to be displayed at the display apparatus. This is because such a type of feature could be acceptably represented in the given pixel even at a low visual-fidelity or a low display resolution. In this regard, the image signal captured by the given pixel of said portion of the first image is lightly processed. Optionally, when the type of feature to which the given pixel pertains is at least one of: an edge, a corner, a high-frequency feature, the corresponding pixel of the second image is to be displayed at the display apparatus. This is because such a type of feature is to be represented in the corresponding pixel at a high visual-fidelity or a high display resolution. In this regard, the image signal captured by the corresponding pixel of the second image is heavily processed.

Optionally, when selectively performing the sequence of image signal processes, the at least one image signal processor is configured to:

perform local contrast enhancement on the given image signal when the given pixel lies in the second region; and perform global contrast enhancement on the given image signal when the given pixel lies in the first region.

In this regard, the given image signal captured by the given pixel lying in the second region corresponds to the gaze direction of the user, and is processed heavily by way of performing the local contrast enhancement to achieve a higher contrast quality as compared to the image signals of the pixels in the first region. In such a case, local contrast details (namely, per-pixel contrast details) in the second region are extremely important, and thus the local contrast enhancement is performed on a per-pixel basis for image signal of pixels lying in the second region. A local contrast value may be determined for the given image signal captured by the given pixel of the second region. Optionally, when performing the local contrast enhancement on the given image signal, the at least one image signal processor is configured to employ a histogram equalization technique. Moreover, the image signals captured by the pixels of the first region (which is a peripheral region of the second region) are processed lightly by way of performing the global contrast enhancement as a low contrast quality is acceptable for the first region (because it does not correspond to the gaze direction of the user). Beneficially, this saves processing resources and processing time of the at least one image signal processor. A single global contrast value may be determined corresponding to all pixels of the first region. Optionally, when performing the global contrast enhancement on the given image signal, the at least one image signal processor is configured to employ at least one of: the histogram equalization technique, a gamma correction technique, a histogram stretching technique, a histogram shrinking technique, a tone-mapping technique, a high dynamic range (HDR) tone-mapping technique. The global contrast enhancement is less computationally intensive as compared to the local contrast enhancement.

It will be appreciated that image enhancements (such contrast enhancements) performed by the at least one image signal processor are related to a capability of the human visual system for detecting contrast, brightness, shadows, colour intensities in a non-linear power law manner. Beneficially, such a manner of contrast enhancement (namely, the local contrast enhancement or the global contrast enhancement) depending on a position of the given pixel emulates visual acuity characteristics of human visual system. In the at least one image generated using such a manner of contrast enhancement, a higher contrast quality is provided for the gaze-contingent pixels of the at least one image as compared to that for the non-gaze-contingent pixels of the at least one image. Therefore, upon displaying, at least one XR image produced using the at least one image, there is beneficially provided immersiveness and realism to the user within an XR environment. Moreover, the at least one image signal processor performs such a manner of varying contrast enhancement to provide optimal contrast in the at least one image, even for a real-world environment with varying lighting conditions.

Optionally, when selectively performing the sequence of image signal processes on the given image signal, the at least one image signal processor is configured to perform at least one of: local and global brightness correction, local and global HDR tone-mapping, local and global false colour correction, local and global memory colour enhancement, based on whether or not the given pixel lies within the predefined distance from the gaze position.

Typically, a human eye can detect a few levels (for example, 100 levels or shades) of gray colour and many levels of other remaining colours (such as red colour, green colour, and the like). Moreover, the human eye can perceive a given colour differently when the given colour has different brightness levels. Thus, colour errors need to rectified properly, (especially for the mid-frequency features captured in the given image signal) when generating the at least one image. Optionally, in this regard, when selectively performing the sequence of image signal processes, the at least one image signal processor is configured to perform local and global colour error correction on the given image signal.

Optionally, when selectively performing the sequence of image signal processes, the at least one image signal processor is configured to perform sharpening and edge enhancement on the given image signal when the given pixel lies in the second region. When the given pixel lies in the second region, that corresponds to the gaze direction of the user, features (such as edges, boundaries, mid-frequency features, high-frequency features, and the like) captured in the given image signal are required to be represented as sharp and/or embossed features in the at least one image, in order to bring focus cues and/or depth cues to the user's eyes when the user views the at least one image (or the at least one XR image produced using the at least one image). When the sharpening and the edge enhancement processes are performed on the given image signal, visual details of the features are enhanced to match a human eye response contrast curve. The sharpening and the edge enhancement processes also facilitate in attenuation of noise in the gaze-contingent pixels of the at least one image, and thus a high visual quality is achieved for such pixels. Moreover, when the sharpening and the edge enhancement processes are performed on image signals corresponding to the first region, undesirable noise would be produced in these image signals, which results in poor visual quality in the at least one image. This subsequently leads to lack of immersion and abstractedness for the user when the user views the at least one image. Therefore, the sharpening and the edge enhancement processes are not performed on the image signals corresponding to the first region. Beneficially, in such a case, processing resources of the at least one image signal processor can be optimally utilized to only perform the sharpening and the edge enhancement process on the given image signal corresponding to the second region.

Optionally, the at least one image signal processor is configured to provide separate processing pipeline paths with different sequences of image signal processes for image signals captured by pixels of the first region and image signals captured by the pixels of the second region. In this regard, the image signals captured by pixels of the first region and the image signals captured by the pixels of the second region are processed differently and to different extents, using the separate processing pipeline paths. Optionally, the separate processing pipeline paths are provided by way of separate hardware blocks. The different sequences of image signal processes may have a different number of image signal processes and/or a different order of image signal processes. As an example, the at least one image signal processor may be configured to provide a first processing pipeline path comprising 4 image signal processes (for example, the black level correction, the lens shading correction, the demosaicking, and the Bayer domain denoising) for processing the image signals captured by the pixels of the first region, and a second processing pipeline path comprising 6 image signal processes (for example, the black level correction, the DPC, the shot noise correction, the lens shading correction, the demosaicking, and the Bayer domain denoising) for processing the image signals captured by the pixels of the second region. For any given image signal process that is to be performed for both the image signals captured by pixels of the first region and the image signals captured by the pixels of the second region, requisite parameters employed for performing the given image signal process could be controlled differently. For example, different colour conversion matrices (having different coefficients) may be employed for processing the image signals captured by pixels of the first region and the image signals captured by the pixels of the second region differently.

Optionally, when the position of the given pixel lies in the first region, the sequence of image signal processes excludes at least one of: defective pixel correction, shot noise correction. Typically, the at least one image sensor comprises pixel errors such as the defective pixel, shot noise defects, or similar. In order to correct the pixel errors, the at least one image signal processor is configured to employ the defective pixel correction and/or the shot noise correction on a per-pixel basis for pixels lying in the second region, to achieve a high visual quality in the at least one image. Optionally, the defective pixel correction and/or the shot noise correction depends on the temperature of the at least one image sensor. Greater the temperature of the at least one image sensor, greater an extent of the defective pixel correction and/or the shot noise correction. The defective pixel correction involves defective pixel detection, and subsequently, either noise cleaning or dead pixel cancellation. When the given pixel is not determined as the dead pixel, noise cleaning is performed. Alternatively, when the given pixel is determined as the dead pixel, dead pixel cancellation is performed. The process of defective pixel correction is described in more detail hereinbelow.

For illustration purposes only, let us consider an example implementation wherein a given image sensor comprises nine pixels arranged as a 3*3 grid on a photo-sensitive surface of the given image sensor. In such a case, a first row of the grid may comprise pixels in the order: P0, P1, P2; a second row of the grid may comprise pixels in the order: P3, P4, P5; and a third row of the grid may comprise pixels in the order: P6, P7, P8.

An image signal process of defective pixel correction involves defective pixel detection, and subsequently, noise cleaning or dead pixel cancellation. In order to detect whether or not a given pixel is defective, an absolute difference between an intensity of the given pixel and an intensity of a neighboring pixel of the given pixel is determined for each neighboring pixel of the given pixel, and then it is checked whether or not each of these absolute differences are greater than a predefined defective pixel correction threshold (dpc_th). When each of these absolute differences are greater than dpc_th, the given pixel is determined as the dead pixel; otherwise, the given pixel is not determined as the dead pixel.

For example, the given pixel is the pixel P4, these absolute differences are determined as: diff40=abs(P4−P0); diff41=abs(P4−P1); diff42=abs(P4−P2); diff43=abs(P4−P3); diff45=abs(P4−P5); diff46=abs(P4−P6); diff47=abs(P4−P7); diff48=abs(P4−P8). Then, if((diff40>dpc_th)&&(diff41>dpc_th)&&
(diff42>dpc_th)&&(diff43>dpc_th)&&(diff45>dpc_th)&&
(diff46>dpc_th)&&(diff47>dpc_th)&&(diff48>dpc_th))
  Is_dead=1
else
  Is_dead=0

When the given pixel is not determined as the dead pixel, noise cleaning is performed as follows:
DV2=abs(2*P4−P1−P7);   DH2=abs(2*P4−P3−P5);
DDL2=abs(2*P4−P0−P8); DDR2=abs(2*P4−P2−P6);
  if((DV2<=DH2)&&(DV2<=DDL2)&&(DH2<=DDR2))
  avg=(P1+P4+P7)/3;

var=abs(P1−avg)+abs(P4−avg)+abs(P7−avg);
 else if((DH2<DV2)&&(DH2<=DDL2)&&(DH2<=DDR2))
  avg=(P3+P4+P5)/3;
  var=abs(P3−avg)+abs(P4−avg)+abs(P5−avg);
 else if((DDL2<DV2)&&(DDL2<DH2)&&(DDL2<=DDR2))
  avg=(P0+P4+P8)/3;
  var=abs(P0−avg)+abs(P4−avg)+abs(P8−avg);
 else
  avg=(P2+P4+P6)/3;
  var=abs(P2−avg)+abs(P4−avg)+abs(P6−avg);
 if(it is noise) output=avg;
 else output=P4

When the given pixel is determined as the dead pixel, dead pixel cancellation is performed as follows:
 DV=abs(2*P4−P1−P7); DH=abs(2*P4−P3−P5); DDL=abs(2*P4−P0−P8); DDR=abs(2*P4−P2−P6);
 if((DV<=DH)&&(DV<=DDL)&&(DH<=DDR))
  new=(P1+P7+1)/2;
 else if((DH<DV)&&(DH<=DDL)&&(DH<=DDR))
  new=(P3+P5+1)/2;
 else if((DDL<DH)&&(DDL<DV)&&(DDL<=DDR))
  new=(P0+P8+1)/2;
 else
  new=(P2+P6+1)/2

It will be appreciated that a person skilled in the art will recognize many variations, alternatives, and modifications of this example implementation.

Optionally, when generating the at least one image, image signals corresponding to the second region are not downscaled and/or the pixel errors are not averaged out. Therefore, the defective pixel correction and/or the shot noise correction processes are performed on the image signals corresponding to the second region individually, in order to rectify such pixel errors. Optionally, when generating the at least one image, image signals corresponding to the first region are downscaled and the pixel errors are averaged out to have little or no effect on visual quality of the at least one image. Therefore, the defective pixel correction and/or the shot noise correction processes need not be performed on the image signals corresponding to the first region. In an example, the image signals corresponding to the first region are downscaled to a new resolution that may lie in a range of 1/16 to 1/2 of an original resolution of the image signals corresponding to the first region. Optionally, various image signals corresponding to the first region are downscaled to various resolutions. Beneficially, the processing resources of the at least one image signal processor can be effectively utilized to only optionally perform the defective pixel correction and/or the shot noise correction on the given image signal corresponding to the second region. The resolution of a given image signal refers to image data detail in the given image signal. Optionally, when downscaling the image signals corresponding to the first region, the at least one image signal processor is configured to employ at least one of: binning, bilinear algorithm, bicubic interpolation, nearest-neighbour interpolation, Lanczos resampling, mipmapping algorithm, guided filter downscaling algorithm.

Optionally, the plurality of parameters comprise a given colour conversion matrix that is to be employed for processing the given image signal, wherein, when controlling the plurality of parameters, the at least one image signal processor is configured to employ a first colour conversion matrix and a second colour conversion matrix for processing image signals captured by pixels of the first region and image signals captured by the pixels of the second region, respectively, wherein coefficients in the second colour conversion matrix are higher than coefficients in the first colour conversion matrix.

The given colour conversion matrix is employed to convert colour values of image signals captured by pixels of a given region to requisite colour values in a given colour space. In this regard, coefficients in the given colour conversion matrix are multiplied by the colour values of image signals to yield the requisite colour values in the given colour space. The requisite colour values in the given colour space are then utilized to generate the at least one image that is to be displayed by at least one light source. In a first example, the given colour conversion matrix may be a 3×3 matrix, the colour values of the given image signal may be represented in form of a 3×1 matrix, and the requisite colour values of the given image signal in the given colour space may be yielded in form of a 3×1 matrix. Optionally, the at least one image signal processor employs at least one mathematical formula for the aforesaid multiplication. It will be appreciated that colour values of different image signals could be converted to requisite colour values in different colour spaces. Optionally, a given colour space is one of: a standard Red-Green-Blue (sRGB) colour space, an RGB colour space, Luminance and two colour differences (YUV) colour space, a Hue-Chroma-Luminance (HCL) colour space, a Hue-Saturation-Lightness (HSL) colour space, a Hue-Saturation-Brightness (HSB) colour space, a Hue-Saturation-Value (HSV) colour space, Luminance, a Hue-Saturation-Intensity (HSI) colour space, blue-difference and red-difference chroma components (YCbCr) colour space. It will be appreciated that the at least one light source has a standardised colour space with a white point (such as D65 for the sRGB colour space) and a colour temperature (such as 6500 Kelvin for the sRGB colour space). In an example, colour values of the image signals captured by the pixels of the second region may belong to the RGB colour space and the requisite colour values corresponding to a given light source may belong the sRGB colour space. A given colour conversion matrix could also be employed to enhance memory colours.

As the coefficients in the second colour conversion matrix are optionally higher than the coefficients in the first colour conversion matrix, a colour processing for the second region is higher than a colour processing for the first region. As a result, a portion of the at least one image corresponding to the second region has a high colour-fidelity (i.e. minimal colour error) and a portion of the at least one image corresponding to the first region has a low noise and a low colour-fidelity. Moreover, when the second region corresponds to the gaze direction of the user, such a manner of providing a variable colour-fidelity in generated at least one image emulates human visual colour perception. It will be appreciated that the variable colour-fidelity in the generated at least one image enables the at least one image signal processor to employ and conserve its processing resources variably and efficiently.

Optionally, the coefficients in the given colour conversion matrix lie in a range of −4 to 4. More optionally, the coefficients in the given colour conversion matrix lie in a range of −3 to 3. Yet more optionally, the coefficients in the given colour conversion matrix lie in a range of −2 to 2. As an example, the coefficients in the given colour conversion matrix may be from −4, −3.8, −3.6, −3.4, −3.2, −3, −2.8, −2.6, −2.4, −2.2, −2, −1.8, −1.6, −1.4, −1.2, −1, −0.8, −0.6, −0.4, −0.2, 0, 0.2, 0.4, 0.6, 0.8, 1, 1.2, 1.4, 1.6, 1.8, 2, 2.2, 2.4, 2.6, 2.8, 3, 3.2, 3.4, 3.6 or 3.8 up to −3.8, −3.6, −3.4, −3.2, −3, −2.8, −2.6, −2.4, −2.2, −2, −1.8, −1.6, −1.4, −1.2, −1, −0.8, −0.6, −0.4, −0.2, 0, 0.2, 0.4, 0.6, 0.8, 1, 1.2, 1.4, 1.6, 1.8, 2, 2.2, 2.4, 2.6, 2.8, 3, 3.2, 3.4, 3.6, 3.8 or 4. Other coefficients in the given colour conversion matrix that lie within and outside the aforesaid ranges are also feasible. Referring to the first example, coefficients in the given colour conversion matrix may be 2.071, −0.711, −0.360, −0.504, 1.864, −0.361, −0.446, −1.825, 3.272.

When the coefficients in the second colour conversion matrix are high, digital gains of the image signals captured by pixels of the second region are also high. In such a case, noise (for example, a luminance noise, a chrominance noise, or similar) in said image signals would get amplified. Such a noise produces undesirable visual effects (such as high amplitude coloured blobs) in the image signals captured by the pixels of the second region despite the high colour-fidelity. Optionally, the at least one image signal processor is configured to attenuate the noise by employing at least one of: a denoising technique, the HDR tone-mapping technique, a high exposure time, an F-number adjustment technique, an image stabilization technique. Such a manner of attenuating noise requires considerable processing resources of the at least one image signal processor. Therefore, the noise attenuation is only optionally performed when processing the image signals captured by the pixels of the second region. Moreover, when the coefficients in the first colour conversion matrix are low (for example, the coefficients are equal to or nearly equal to 1), digital gains of the image signals captured by the pixels of the first region are also low. In such a case, the noise in said image signals is minimal as F-number diminishes, for example, from F2.8 to F2.0, and therefore may not require further processing.

It will be appreciated that optionally the given colour conversion matrix that is to be employed for processing the given image signal depends on a type of the at least one light source. In an example, a gamut display may require a colour conversion matrix with low coefficients. When there is a plurality of light sources, other parameters thereof may be taken into account for required coefficients in the given colour conversion matrix.

Optionally, the at least one image signal processor is configured to analyze a given image to select a requisite colour conversion matrix from amongst a plurality of colour conversion matrices. This requisite colour conversion matrix may be employed for generating at least one subsequent image of the given image. The plurality of colour conversion matrices may be stored at a data repository coupled in communication with the at least one image signal processor. Said analysis could be done for example, by calculating a histogram of colours in the given image, by estimating a colour temperature of the given image using chromaticity (RG/BG colour values) and the automatic white balance. This analysis could be performed intermittently (at regular or irregular intervals) for example, after every 100 images, then 150 images, or so. Prior to this analysis, the given image (or its statistics) may be downscaled. Moreover, a selection of the requisite colour conversion matrix from amongst the plurality of colour conversion matrices may be based on the statistics of the at least one image.

Optionally, the plurality of parameters comprise a given colour conversion matrix that is to be employed for processing the given image signal, wherein, when controlling the plurality of parameters, the at least one image signal processor is configured to employ a first colour conversion matrix for processing image signals captured by pixels of the first region, a second colour conversion matrix for processing image signals captured by pixels of the second region that pertain to at least one blob in the at least one image, and a third colour conversion matrix for processing image signals captured by the pixels of the second region that pertain to at least one of: an edge, a corner, a high-frequency feature, wherein coefficients in the second colour conversion matrix are higher than coefficients in the first colour conversion matrix and coefficients in the third colour conversion matrix. The at least one blob may be considered as at least one large region (comprising a group of pixels) in the at least one image. The at least one blob produces undesirable visual effects in the at least one image, and thus the at least one blob is required to be minimized or eliminated in the at least one image.

Optionally, the at least one image signal processor is configured to analyze which image signals captured by pixels of the second region pertain to the at least one blob in the at least one image. Alternatively, optionally, the at least one image signal processor is configured to obtain information pertaining to the image signals captured by the pixels of the second region that pertain to the at least one blob in the at least one image from a data repository. It will be appreciated that the data repository could be implemented as a cloud-based memory, a memory of the system, a memory of the display apparatus, or similar.

The at least one image signal processor optionally employs a requisite colour conversion matrix for processing image signals captured by pixels of a given region in the following manner. Optionally, when the image signals captured by pixels of the second region that pertain to the at least one blob in the at least one image, high extent of processing is required for minimization or removal of the at least one blob in the at least one image. Therefore, highest coefficients are provided in the second colour conversion matrix from amongst three colour conversion matrices (namely, the first, second, and third colour conversion matrices). Moreover, when the second region corresponds to the gaze direction of the user, high extent of processing is required for minimization or removal of the at least one blob represented in the gaze-contingent pixels of the at least one image. Therefore, highest coefficients are provided in the second colour conversion matrix. Optionally, when the image signals captured by the pixels of the second region pertain to at least one of: the edge, the corner, the high-frequency feature in the at least one image, such feature(s) is/are to be perceived with high visual acuity by foveas of the user's eyes. Therefore, second highest coefficients are provided in the third colour conversion matrix from amongst the three colour conversion matrices, as the image signals corresponding to the aforesaid feature(s) require a moderate extent of processing for a high colour-fidelity. Optionally, lowest coefficients are provided in the first colour conversion matrix from amongst the three colour conversion matrices, as the image signals captured by pixels of the first region are lightly processed. In such a case, a portion of the at least one image corresponding to the first region has a low noise and low colour-fidelity. Moreover, when the first region corresponds to the peripheral region of the second image, lowest extent of processing is required in the non-gaze-contingent pixels of the at least one image. Beneficially, such a manner of variable extent of processing depending on a position of the given pixel emulates visual characteristics of human visual system.

Optionally, the first colour conversion matrix is the third colour conversion matrix. Optionally, in this regard, the at least one image signal processor is configured to employ a single colour conversion matrix having required coefficients for processing the image signals captured by pixels of the first region and the image signals captured by the pixels of the second region that pertain to at least one of: the edge, the corner, the high-frequency feature, in the same manner and extent.

Optionally, the at least one image signal processor is configured to selectively perform the sequence of image signal processes and control the plurality of parameters employed therefor, further based on whether or not the given image signal represents a part of a salient feature in the at least one image. Optionally, in this regard, the plurality of parameters comprise a given colour conversion matrix that is to be employed for processing the given image signal. When the given image signal represents the part of the salient feature, the at least one image signal processor is configured to select the given colour conversion matrix to provide a high colour-fidelity to the part of the salient feature represented by the given image signal. Such a given colour conversion matrix has high coefficients. This is because the salient features in the at least one image are visually alluring (namely, have high saliency), and the user is more likely to focus on the salient features as compared to other features in the at least one image. Therefore, such salient features should have a high visual quality in the at least one image. For example, the user is more likely to focus on an edge, a corner, or a high-frequency texture detail as compared to interior features or low-frequency texture detail, since the former types of features are more visually alluring compared to the latter. When the given image signal does not represent the part of the salient feature, the at least one image signal processor is configured to select a requisite colour conversion matrix to provide a low colour-fidelity.

Optionally, the at least one image signal processor is configured to assign a saliency score to the salient feature in the at least one image. This saliency score is used by the at least one image signal processor to determine an extent of colour-fidelity required for the salient feature in the at least one image. Greater the saliency score, greater is the extent of colour-fidelity required for the salient feature in the at least one image, and vice versa. Optionally, the saliency score lies in a range of 0 to 1. For example, the saliency score may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1. Other ranges of the saliency score are also feasible. Optionally, when assigning the saliency score to the salient feature in the at least one image, the at least one image signal processor is configured to employ at least one of: a psycho-visual factor, an artificial intelligence (AI) algorithm.

It will be appreciated that that when a size of the at least one image sensor is very large (for example, the at least one image sensor has 100 million pixels), scaling process is required to be performed for the image signals captured by the plurality of pixels of the at least one image sensor. In such a case, the scaling process may employ a high scaling factor. During the scaling process, image signals representing the salient feature (for example, a slanted edge) could be scaled in various manners. In an example, the image signals representing the salient feature and neighbouring pixels of the salient feature may be averaged together. In another example, one image signal from amongst the image signals representing the salient feature and neighbouring pixels of the salient feature may be selected as a scaled image signal. In yet another example, the image signals representing the salient feature and neighbouring pixels of the salient feature may be processed using a requisite mathematical and/or analytical function to obtain a scaled image signal.

The present disclosure also relates to the method as described above.

Various embodiments and variants disclosed above, with respect to the aforementioned first aspect, apply mutatis mutandis to the method.

Optionally, the method further comprises:
determining at least a first region and a second region within the photo-sensitive surface whose image signals are to be processed differently;
detecting whether the position of the given pixel lies in the first region or the second region; and
controlling the plurality of parameters based on whether the position of the given pixel lies in the first region or the second region.

In an embodiment, the method further comprises:
receiving, from a display apparatus, information indicative of a gaze direction of a user;
identifying a gaze position on the photo-sensitive surface, based on the gaze direction of the user; and
determining the first region and the second region based on the gaze position on the photo-sensitive surface, wherein the second region includes and surrounds the gaze position, and the first region surrounds the second region.

In another embodiment, the method further comprises determining the first region and the second region based on a centre of the photo-sensitive surface, wherein the second region includes and surrounds the centre, and the first region surrounds the second region.

Optionally, in the method, the system further comprises an optical element comprising a first optical portion and a second optical portion having a first focal length and a second focal length, respectively, the first optical portion and the second optical portion being arranged to pass light towards the first region and the second region of the photo-sensitive surface, respectively, wherein the method further comprises controlling the plurality of parameters, based on the first focal length and the second focal length.

Optionally, in the method, the at least one image comprises a first image and a second image, wherein the method further comprises:
creating a first copy and a second copy of image signals captured by pixels of the second region, wherein the first copy of the image signals is to be processed with image signals captured by pixels of the first region to generate the first image, while the second copy of the image signals captured by the pixels of the second region is to be processed separately to generate the second image, wherein the first image and the second image are to be displayed via a first light source and a second light source of a display apparatus, respectively, in a manner that a portion of the first image that is generated from the first copy of the image signals is to be optically combined with the second image;
determining, for a given pixel of said portion of the first image, whether the given pixel of said portion of the first image or a corresponding pixel of the second image is to be displayed at the display apparatus, based on a type of feature to which the given pixel pertains; and
selectively performing different sequences of image signal processes on an image signal captured by the given pixel and an image signal captured by the corresponding pixel, based on whether the given pixel or the corresponding pixel is to be displayed at the display apparatus.

Optionally, in the method, the at least one image sensor comprises a first image sensor and a second image sensor, and the at least one image comprises a first image and a second image corresponding to image signals captured by pixels of the first image sensor and image signals captured by pixels of the second image sensor, respectively, and wherein a portion of a field of view captured in the first image overlaps with a field of view captured in the second image, further wherein the first image and the second image are to be displayed via a first light source and a second light source of a display apparatus, respectively, in a manner that a portion of the first image that corresponds to said portion of the field of view is to be optically combined with the second image, the method further comprising:

determining, for a given pixel of said portion of the first image, whether the given pixel of said portion of the first image or a corresponding pixel of the second image is to be displayed at the display apparatus, based on a type of feature to which the given pixel pertains, and selectively performing different sequences of image signal processes on an image signal captured by the given pixel and an image signal captured by the corresponding pixel, based on whether the given pixel or the corresponding pixel is to be displayed at the display apparatus.

Optionally, in the method, the step of selectively performing the sequence of image signal processes comprises:

performing local contrast enhancement on the given image signal when the given pixel lies in the second region; and performing global contrast enhancement on the given image signal when the given pixel lies in the first region.

Optionally, in the method, the step of selectively performing the sequence of image signal processes comprises performing sharpening and edge enhancement on the given image signal when the given pixel lies in the second region.

Optionally, the method further comprises providing separate processing pipeline paths with different sequences of image signal processes for image signals captured by pixels of the first region and image signals captured by pixels of the second region.

Optionally, in the method, when the position of the given pixel lies in the first region, the sequence of image signal processes excludes at least one of: defective pixel correction, shot noise correction.

Optionally, in the method, the plurality of parameters comprise a given colour conversion matrix that is to be employed for processing the given image signal, wherein the step of controlling the plurality of parameters comprises employing a first colour conversion matrix and a second colour conversion matrix for processing image signals captured by pixels of the first region and image signals captured by pixels of the second region, respectively, wherein coefficients in the second colour conversion matrix are higher than coefficients in the first colour conversion matrix.

Optionally, in the method, the plurality of parameters comprise a given colour conversion matrix that is to be employed for processing the given image signal, wherein the step of controlling the plurality of parameters comprises employing a first colour conversion matrix for processing image signals captured by pixels of the first region, a second colour conversion matrix for processing image signals captured by pixels of the second region that pertain to at least one blob in the at least one image, and a third colour conversion matrix for processing image signals captured by pixels of the second region that pertain to at least one of: an edge, a corner, a high-frequency feature, wherein coefficients in the second colour conversion matrix are higher than coefficients in the first colour conversion matrix and coefficients in the third colour conversion matrix.

Optionally, in the method, the first colour conversion matrix is the third colour conversion matrix.

Optionally, the method further comprises selectively performing the sequence of image signal processes and controlling the plurality of parameters employed therefor, further based on whether or not the given image signal represents a part of a salient feature in the at least one image.

Optionally, the method further comprises:
receiving, from a display apparatus, information indicative of a gaze direction of a user;
identifying a gaze position on the photo-sensitive surface, based on the gaze direction of the user; and
selectively performing the sequence of image signal processes on the given image signal and control the plurality of parameters employed therefor, further based on whether or not the given pixel lies within a predefined distance from the gaze position.

Optionally, the method further comprises selectively performing the sequence of image signal processes and controlling the plurality of parameters employed therefor, further based on at least one of: a temperature of the at least one image sensor, a rate at which a pose of the at least one image sensor is changing while capturing the plurality of image signals.

DETAILED DESCRIPTION OF THE DRAWINGS

Referring to FIG. 1, illustrated is a block diagram of an architecture of a system 100, in accordance with an embodiment of the present disclosure. The system 100 comprises at least one image sensor (depicted as an image sensor 102) and at least one image signal processor (depicted as an image signal processor 104). The image sensor 102 is communicably coupled to the image signal processor 104.

Figure 2:
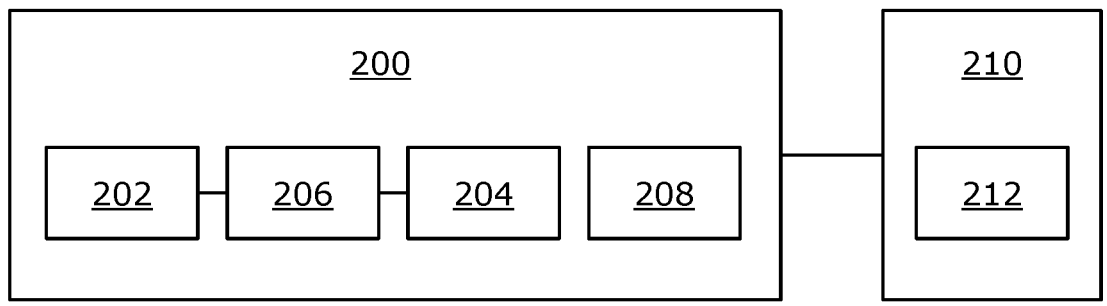

Referring to FIG. 2, illustrated is a block diagram of an architecture of a system 200, in accordance with another embodiment of the present disclosure. The system 200 comprises at least one image sensor (depicted as a first image sensor 202 and a second image sensor 204) and at least one image signal processor (depicted as an image signal processor 206). The first image sensor 202 and the second image sensor 204 are communicably coupled to the image signal processor 206. The system 200 further comprises an optical element 208 through which light passes towards photo-sensitive surfaces of the first image sensor 202 and the second image sensor 204. The system 200 is communicably coupled to a display apparatus 210. The display apparatus 210 comprises a gaze-tracking system 212.

FIGS. 1 and 2 are merely examples, which should not unduly limit the scope of the claims herein. It will be appreciated that the systems 100 and 200 are provided as examples and are not to be construed as limiting the systems 100 and 200 to specific numbers or types of components. A person skilled in the art will recognize many variations, alternatives, and modifications of embodiments of the present disclosure.

Figure 3:
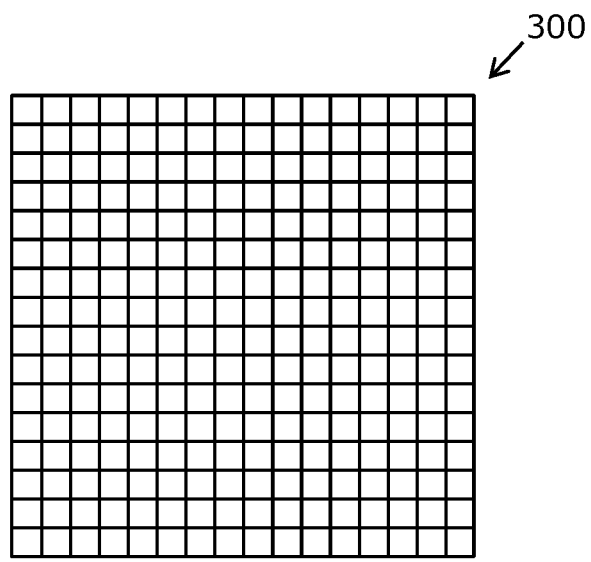
FIG. 3 illustrates a photo-sensitive surface of a given image sensor, in accordance with an embodiment of the present disclosure.

Referring to FIG. 3, illustrated is a photo-sensitive surface 300 of a given image sensor, in accordance with an embodiment of the present disclosure. The given image sensor comprises a plurality of pixels (depicted, for example, as 256 pixels) arranged on the photo-sensitive surface 300. The 256 pixels are shown to be arranged as a 16*16 grid of pixels on the photo-sensitive surface 300.

FIG. 3 is merely an example, which should not unduly limit the scope of the claims herein. A person skilled in the art will recognize many variations, alternatives, and modifications of embodiments of the present disclosure. For example, the plurality of pixels could be arranged in a circular arrangement, an elliptical arrangement, a hexagonal arrangement, or similar.

Figure 4A:
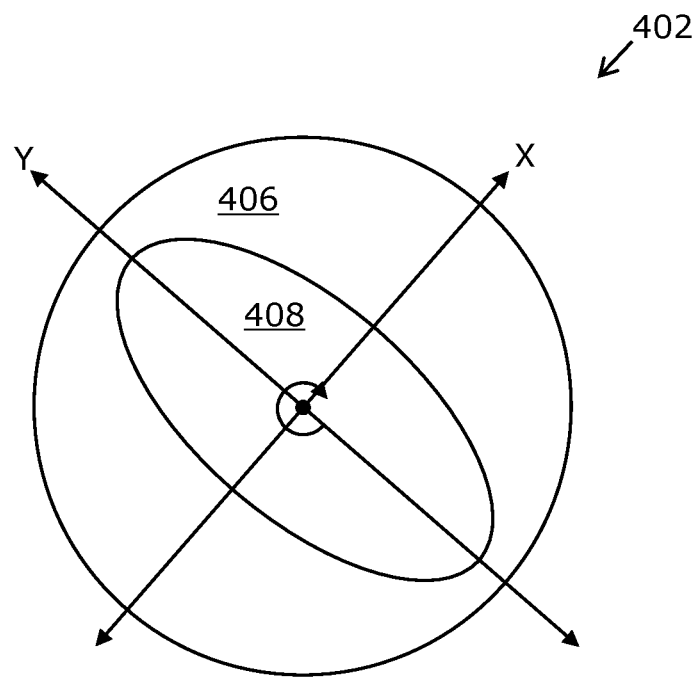
Figure 4B:
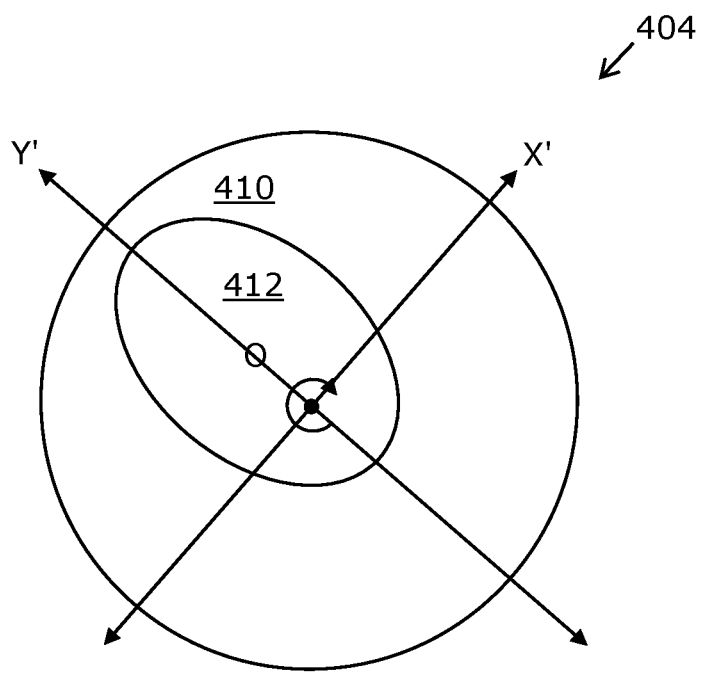
FIG. 4B is a schematic illustration of an asymmetrical optical element, in accordance with an embodiment of the present disclosure.

Referring to FIGS. 4A and 4B, FIG. 4A is a schematic illustration of a symmetrical optical element 402, while FIG. 4B is a schematic illustration of an asymmetrical optical element 404, in accordance with an embodiment of the present disclosure.

In FIG. 4A, the symmetrical optical element 402 is shown to be symmetrical about its optical axis. The symmetrical optical element 402 comprises a first optical portion 406 and a second optical portion 408 having different focal lengths. The second optical portion 408 is shown to be ellipsoidal in shape. There is also shown an optical center (depicted by a black dot) of the second optical portion 408, which is also an optical center of the symmetrical optical element 402. Two lines representing X and Y directions pass through the optical center of the symmetrical optical element 402.

In FIG. 4B, the asymmetrical optical element 404 is shown to be asymmetrical about its optical axis. The asymmetrical optical element 404 comprises a first optical portion 410 and a second optical portion 412 having different focal lengths. The second optical portion 412 is shown to be ellipsoidal in shape. There is also shown an optical center 'O' of the second optical portion 412, and an optical center (depicted by a black dot) of the asymmetrical optical element 404. Two lines representing X' and Y' directions pass through the optical center of the asymmetrical optical element 404.

FIGS. 4A and 4B are merely examples, which should not unduly limit the scope of the claims herein. A person skilled in the art will recognize many variations, alternatives, and modifications of embodiments of the present disclosure.

Figure 5:
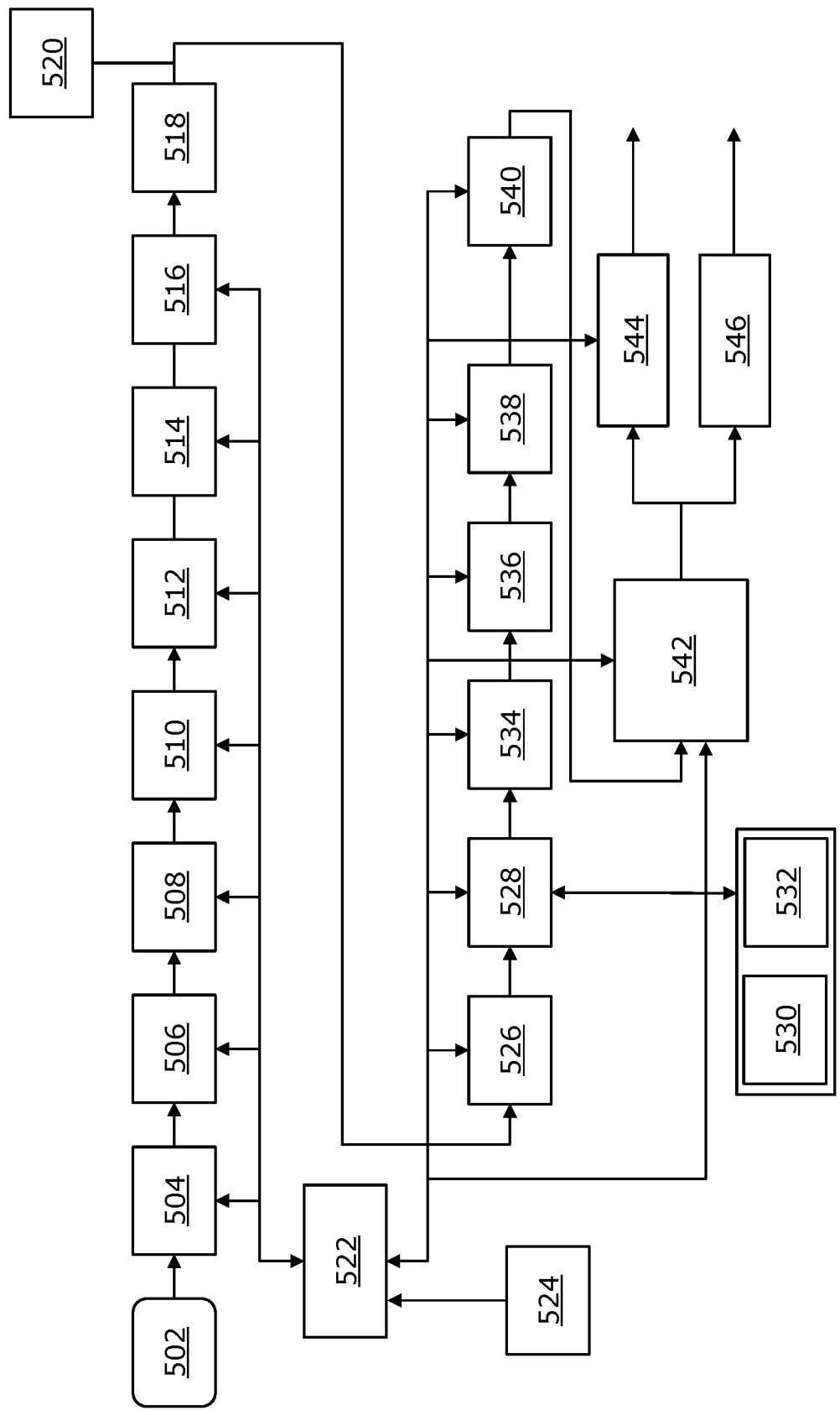
FIG. 5 illustrates a process flow in an image signal processor, in accordance with an embodiment of the present disclosure.

Referring to FIG. 5, illustrated is a process flow in an image signal processor, in accordance with an embodiment of the present disclosure. Hardware elements involved in the process flow are depicted as blocks. Light entering a given image sensor passes through a colour filter array 502 and is captured as images signals by pixels of the given image sensor, at an input interface 504 to the given image sensor. The input interface 504 is based, for example, on MIPI specification.

At 506, the image signals undergo black level correction. Then, at 508, the image signals undergo dead pixel detection (DPD) and dead pixel correction (DPC). Next, at 510, the image signals undergo Bayer domain denoising. Thereafter, at 512, the image signals undergo lens shading correction. Then, at 514, the image signals undergo scaling, and at 516, the image signals undergo automatic white balance gain adjustment. Next, at 518, the image signals undergo demosaicking. After this, automatic white balance static parameters are applied to the image signals at 520.

In the image signal processor, parameters employed for performing image signal processes are controlled by a control module 522. The control module 522 receives as input, one or more input factors (such as information indicative of a gaze direction of a user, a rate at which a pose of the image sensor is changing while capturing the image signals, and the like) from a module 524.

Next, a colour conversion matrix 526 and colour conversion matrix interpolation 528 are employed for processing the image signals. The colour conversion matrix interpolation 528 also involves autofocus 530 and/or auto exposure 532. At 534, the image signals undergo gamma correction. Next, at 536, the image signals undergo colour space conversion, and at 538, the image signals undergo luma and chroma denoising. Then, at 540, the image signals undergo sharpening and edge enhancement. At 542, the image signals are processed to obtain requisite contrast. Thereafter, the image signals undergo cropping and resizing at 544 and 546.

FIG. 5 is merely an example, which should not unduly limit the scope of the claims herein. A person skilled in the art will recognize many variations, alternatives, and modifications of embodiments of the present disclosure. For example, the aforesaid processing operations may be selectively performed for the image signals in a manner that different sequences of processing operations are performed for different image signals.

Figure 6:
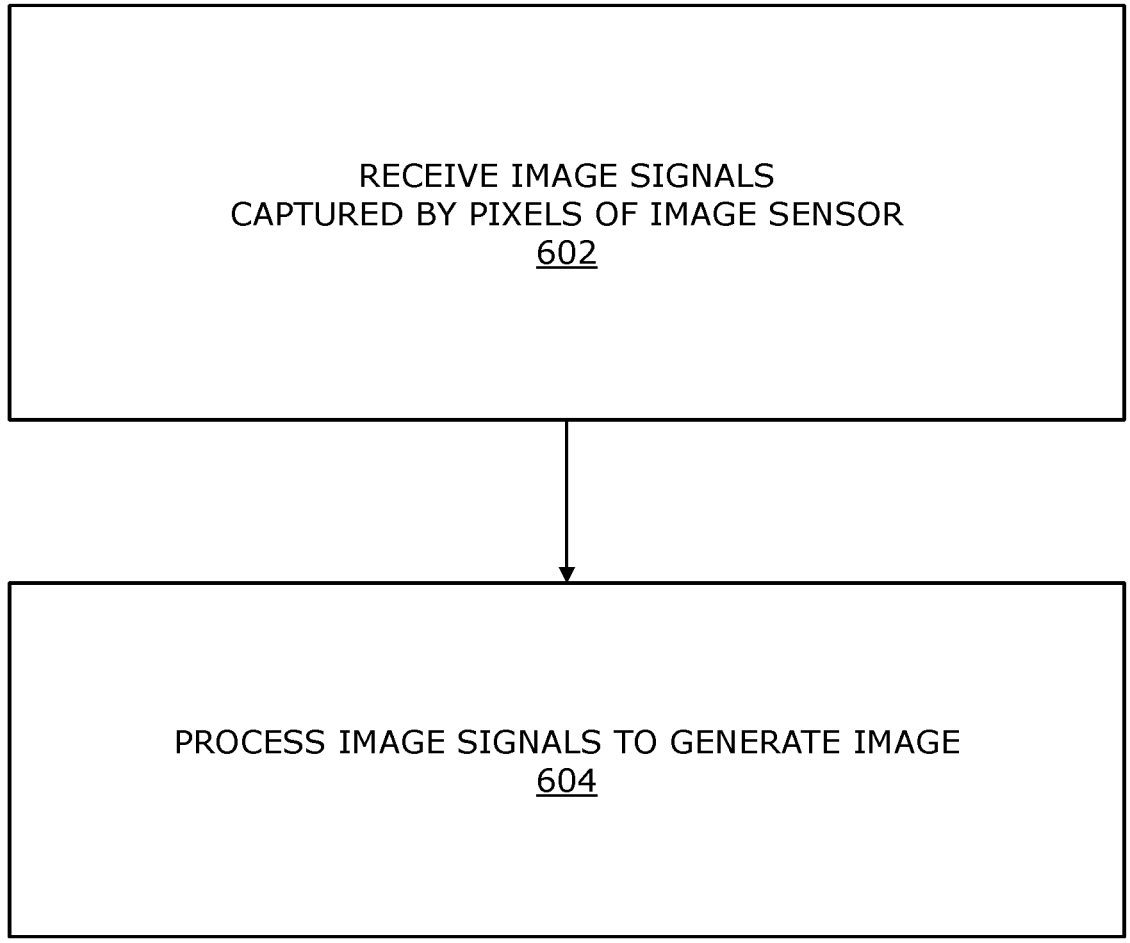
FIG. 6 illustrates steps of a method for selective image signal processing, in accordance with an embodiment of the present disclosure.

Referring to FIG. 6, illustrated are steps of a method for image signal processing, in accordance with an embodiment of the present disclosure. The method is performed by a system comprising at least one image sensor, wherein the at least one image sensor comprises a plurality of pixels arranged on a photo-sensitive surface thereof. At step 602, there are received, from the at least one image sensor, a plurality of image signals captured by corresponding pixels of the at least one image sensor. At step 604, the plurality of image signals are processed to generate at least one image by: determining, for a given image signal to be processed, a position of a given pixel on the photo-sensitive surface that is employed to capture the given image signal; and selectively performing a sequence of image signal processes on the given image signal and controlling a plurality of parameters employed for performing the sequence of image signal processes, based on the position of the given pixel.

The steps 602 and 604 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system comprising:
   at least one image sensor comprising a plurality of pixels arranged on a photo-sensitive surface thereof; and
   at least one image signal processor configured to:
   receive, from the at least one image sensor, a plurality of image signals captured by corresponding pixels of the at least one image sensor; and
   process the plurality of image signals to generate at least one image, wherein, when processing, the at least one image signal processor is configured to:
   determine, for a given image signal to be processed, a position of a given pixel on the photo-sensitive surface that is employed to capture the given image signal; and
   selectively perform a sequence of image signal processes on the given image signal and control a plurality of parameters employed for performing the sequence of image signal processes, based on the position of the given pixel; and determine at least a first region and a second region within the photo-sensitive surface whose image signals are to be processed differently;

detect whether the position of the given pixel lies in the first region or the second region;

control the plurality of parameters based on whether the position of the given pixel lies in the first region or the second region; and provide separate processing pipeline paths with different sequences of image signal processes for image signals captured by pixels of the first region and image signals captured by pixels of the second region.

2. The system of claim 1, wherein the at least one image signal processor is configured to:

receive, from a display apparatus-, information indicative of a gaze direction of a user;

identify a gaze position on the photo-sensitive surface-, based on the gaze direction of the user; and determine the first region and the second region based on the gaze position on the photo-sensitive surface, wherein the second region includes and surrounds the gaze position, and the first region surrounds the second region.

3. The system of claim 1, wherein the at least one image signal processor is configured to determine the first region and the second region based on a centre of the photo-sensitive surface, wherein the second region includes and surrounds the centre, and the first region surrounds the second region.

4. The system of claim 2, further comprising an optical element comprising a first optical portion and a second optical portion having a first focal length and a second focal length, respectively, the first optical portion and the second optical portion being arranged to pass light towards the first region and the second region of the photo-sensitive surface, respectively, wherein the at least one image signal processor is configured to control the plurality of parameters, based on the first focal length and the second focal length.

5. The system of claim 2, wherein the at least one image comprises a first image and a second image, wherein the at least one image signal processor is configured to:

create a first copy and a second copy of image signals captured by pixels of the second region, wherein the first copy of the image signals is to be processed with image signals captured by pixels of the first region to generate the first image, while the second copy of the image signals captured by the pixels of the second region is to be processed separately to generate the second image, wherein the first image and the second image are to be displayed via a first light source and a second light source of a display apparatus, respectively, in a manner that a portion of the first image that is generated from the first copy of the image signals is to be optically combined with the second image;

determine, for a given pixel of said portion of the first image, whether the given pixel of said portion of the first image or a corresponding pixel of the second image is to be displayed at the display apparatus, based on a type of feature to which the given pixel pertains; and selectively perform different sequences of image signal processes on an image signal captured by the given pixel and an image signal captured by the corresponding pixel, based on whether the given pixel or the corresponding pixel is to be displayed at the display apparatus.

6. The system of claim 2, wherein the at least one image sensor comprises a first image sensor and a second image sensor, and the at least one image comprises a first image and a second image corresponding to image signals captured by pixels of the first image sensor and image signals captured by pixels of the second image sensor, respectively, and wherein a portion of a field of view captured in the first image overlaps with a field of view captured in the second image, further wherein the first image and the second image are to be displayed via a first light source and a second light source of a display apparatus, respectively, in a manner that a portion of the first image that corresponds to said portion of the field of view is to be optically combined with the second image, the at least one image signal processor being configured to:

determine, for a given pixel of said portion of the first image, whether the given pixel of said portion of the first image or a corresponding pixel of the second image is to be displayed at the display apparatus, based on a type of feature to which the given pixel pertains; and selectively perform different sequences of image signal processes on an image signal captured by the given pixel and an image signal captured by the corresponding pixel, based on whether the given pixel or the corresponding pixel is to be displayed at the display apparatus.

7. The system of claim 2, wherein, when selectively performing the sequence of image signal processes, the at least one image signal processor is configured to:

perform local contrast enhancement on the given image signal when the given pixel lies in the second region; and perform global contrast enhancement on the given image signal when the given pixel lies in the first region.

8. The system of claim 2, wherein, when selectively performing the sequence of image signal processes, the at least one image signal processor is configured to perform sharpening and edge enhancement on the given image signal when the given pixel lies in the second region.

9. The system of claim 1, wherein when the position of the given pixel lies in the first region, the sequence of image signal processes excludes at least one of: defective pixel correction, shot noise correction.

10. The system of claim 1, wherein the plurality of parameters comprise a given colour conversion matrix that is to be employed for processing the given image signal, wherein, when controlling the plurality of parameters, the at least one image signal processor is configured to employ a first colour conversion matrix and a second colour conversion matrix for processing image signals captured by pixels of the first region and image signals captured by pixels of the second region, respectively, wherein coefficients in the second colour conversion matrix are higher than coefficients in the first colour conversion matrix.

11. The system of claim 1, wherein the plurality of parameters comprise a given colour conversion matrix that is to be employed for processing the given image signal, wherein, when controlling the plurality of parameters, the at least one image signal processor is configured to employ a first colour conversion matrix for processing image signals captured by pixels of the first region, a second colour conversion matrix for processing image signals captured by pixels of the second region that pertain to at least one blob in the at least one image, and a third colour conversion matrix for processing image signals captured by pixels of the second region that pertain to at least one of: an edge, a corner, a high-frequency feature, wherein coefficients in the second colour conversion matrix are higher than coefficients in the first colour conversion matrix and coefficients in the third colour conversion matrix.

12. The system of claim 11, wherein the first colour conversion matrix is the third colour conversion matrix.

13. The system of claim 1, wherein the at least one image signal processor is configured to selectively perform the sequence of image signal processes and control the plurality of parameters employed therefor, further based on whether or not the given image signal represents a part of a salient feature in the at least one image.

14. The system of claim 1, wherein the at least one image signal processor is configured to:
receive, from a display apparatus, information indicative of a gaze direction of a user;
identify a gaze position on the photo-sensitive surface, based on the gaze direction of the user; and
selectively perform the sequence of image signal processes on the given image signal and control the plurality of parameters employed therefor, further based on whether or not the given pixel lies within a predefined distance from the gaze position.

15. The system of claim 1, wherein the at least one image signal processor is configured to selectively perform the sequence of image signal processes and control the plurality of parameters employed therefor, further based on at least one of: a temperature of the at least one image sensor, a rate at which a pose of the at least one image sensor is changing while capturing the plurality of image signals.

16. A method for selective image signal processing, via a system comprising at least one image sensor, wherein the at least one image sensor comprises a plurality of pixels arranged on a photo-sensitive surface thereof, the method comprising:
receiving, from the at least one image sensor, a plurality of image signals captured by corresponding pixels of the at least one image sensor; and
processing the plurality of image signals to generate at least one image by:
determining, for a given image signal to be processed, a position of a given pixel on the photo-sensitive surface that is employed to capture the given image signal; and
selectively performing a sequence of image signal processes on the given image signal and controlling a plurality of parameters employed for performing the sequence of image signal processes, based on the position of the given pixel
determining at least a first region and a second region within the photo-sensitive surface whose image signals are to be processed differently;
detecting whether the position of the given pixel lies in the first region or the second region;
controlling the plurality of parameters based on whether the position of the given pixel lies in the first region or the second region; and
providing separate processing pipeline paths with different sequences of image signal processes for image signals captured by pixels of the first region and image signals captured by pixels of the second region.

17. The method of claim 16, further comprising:
receiving, from a display apparatus, information indicative of a gaze direction of a user;
identifying a gaze position on the photo-sensitive surface, based on the gaze direction of the user; and
determining the first region and the second region based on the gaze position on the photo-sensitive surface, wherein the second region includes and surrounds the gaze position, and the first region surrounds the second region.

18. The method of claim 16, further comprising determining the first region and the second region based on a centre of the photo-sensitive surface, wherein the second region includes and surrounds the centre, and the first region surrounds the second region.

19. The method of claim 17, wherein the system further comprises an optical element comprising a first optical portion and a second optical portion having a first focal length and a second focal length, respectively, the first optical portion and the second optical portion being arranged to pass light towards the first region and the second region of the photo-sensitive surface, respectively, wherein the method further comprises controlling the plurality of parameters, based on the first focal length and the second focal length.

20. The method of claim 17, wherein the at least one image comprises a first image and a second image, wherein the method further comprises:
creating a first copy and a second copy of image signals captured by pixels of the second region, wherein the first copy of the image signals is to be processed with image signals captured by pixels of the first region to generate the first image, while the second copy of the image signals captured by the pixels of the second region is to be processed separately to generate the second image, wherein the first image and the second image are to be displayed via a first light source and a second light source of a display apparatus, respectively, in a manner that a portion of the first image that is generated from the first copy of the image signals is to be optically combined with the second image;
determining, for a given pixel of said portion of the first image, whether the given pixel of said portion of the first image or a corresponding pixel of the second image is to be displayed at the display apparatus, based on a type of feature to which the given pixel pertains; and
selectively performing different sequences of image signal processes on an image signal captured by the given pixel and an image signal captured by the corresponding pixel, based on whether the given pixel or the corresponding pixel is to be displayed at the display apparatus.

21. The method of claim 17, wherein the at least one image sensor comprises a first image sensor and a second image sensor, and the at least one image comprises a first image and a second image corresponding to image signals captured by pixels of the first image sensor and image signals captured by pixels of the second image sensor, respectively, and wherein a portion of a field of view captured in the first image overlaps with a field of view captured in the second image, further wherein the first image and the second image are to be displayed via a first light source and a second light source of a display apparatus, respectively, in a manner that a portion of the first image that corresponds to said portion of the field of view is to be optically combined with the second image, the method further comprising:
determining, for a given pixel of said portion of the first image, whether the given pixel of said portion of the first image or a corresponding pixel of the second image is to be displayed at the display apparatus, based on a type of feature to which the given pixel pertains; and selectively performing different sequences of image signal processes on an image signal captured by the given pixel and an image signal captured by the corresponding pixel, based on whether the given pixel or the corresponding pixel is to be displayed at the display apparatus.

22. The method of claim 17, wherein the step of selectively performing the sequence of image signal processes comprises:

performing local contrast enhancement on the given image signal when the given pixel lies in the second region; and performing global contrast enhancement on the given image signal when the given pixel lies in the first region.

23. The method of claim 17, wherein the step of selectively performing the sequence of image signal processes comprises performing sharpening and edge enhancement on the given image signal when the given pixel lies in the second region.

24. The method of claim 16, wherein when the position of the given pixel lies in the first region, the sequence of image signal processes excludes at least one of: defective pixel correction, shot noise correction.

25. The method of claim 16, wherein the plurality of parameters comprise a given colour conversion matrix that is to be employed for processing the given image signal, wherein the step of controlling the plurality of parameters comprises employing a first colour conversion matrix and a second colour conversion matrix for processing image signals captured by pixels of the first region and image signals captured by pixels of the second region, respectively, wherein coefficients in the second colour conversion matrix are higher than coefficients in the first colour conversion matrix.

26. The method of claim 16, wherein the plurality of parameters comprise a given colour conversion matrix that is to be employed for processing the given image signal, wherein the step of controlling the plurality of parameters comprises employing a first colour conversion matrix for processing image signals captured by pixels of the first region, a second colour conversion matrix for processing image signals captured by pixels of the second region that pertain to at least one blob in the at least one image, and a third colour conversion matrix for processing image signals captured by pixels of the second region that pertain to at least one of: an edge, a corner, a high-frequency feature, wherein coefficients in the second colour conversion matrix are higher than coefficients in the first colour conversion matrix and coefficients in the third colour conversion matrix.

27. The method of claim 26, wherein the first colour conversion matrix is the third colour conversion matrix.

28. The method of claim 16, further comprising selectively performing the sequence of image signal processes and controlling the plurality of parameters employed therefor, further based on whether or not the given image signal represents a part of a salient feature in the at least one image.

29. The method of claim 16, further comprising:

receiving, from a display apparatus, information indicative of a gaze direction of a user;

identifying a gaze position on the photo-sensitive surface, based on the gaze direction of the user; and selectively performing the sequence of image signal processes on the given image signal and control the plurality of parameters employed therefor, further based on whether or not the given pixel lies within a predefined distance from the gaze position.

30. The method of claim 16, further comprising selectively performing the sequence of image signal processes and controlling the plurality of parameters employed therefor, further based on at least one of: a temperature of the at least one image sensor, a rate at which a pose of the at least one image sensor is changing while capturing the plurality of image signals.

* * * * *